May 13, 1941. G. G. WITTWER ET AL 2,242,098
INSECT TRAP
Filed July 15, 1939
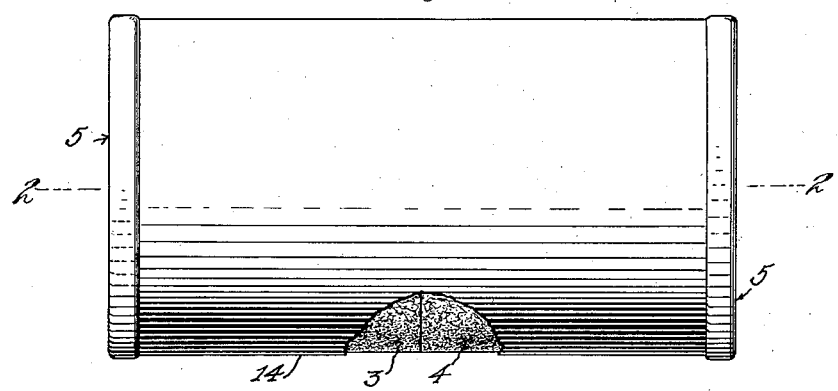
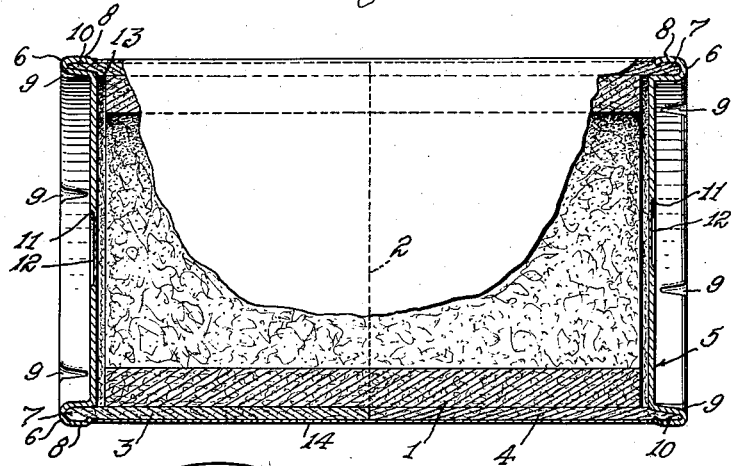
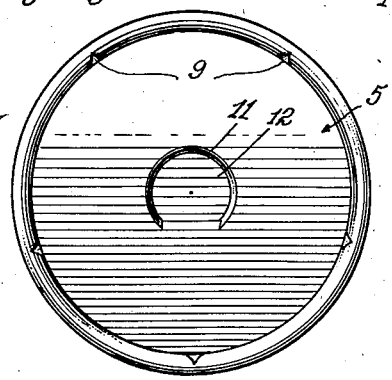
INVENTORS
George G. Wittwer
William M. Stieh
BY
A. D. T. Libby
ATTORNEY Patented May 13, 1941

2,242,098

UNITED STATES PATENT OFFICE 2,242,098

INSECT TRAP

George G. Wittwer, Chappaqua, N. Y., and William M. Stieh, Teaneck, N. J., assignors to Lethelin Products Co., Inc., Mount Vernon, N. Y., a corporation of New York Application July 15, 1939, Serial No. 284,621

1 Claim. (Cl. 43—131)

This invention relates to a device for holding bait for killing insects, such as ants, roaches and the like.

One of the objects of the invention is to provide an insect trap of a new and novel design which is cheap to construct, yet one that is rigid and will consequently stand rough handling, without the parts becoming displaced and thereby effectively retain the bait within the trap and hence eliminate all danger of persons and domestic animals coming into contact with the bait.

Another object of our invention is to provide an insect trap which has certain novel features which add to the general appearance, usefulness, etc., of the trap.

Other objects will be discerned from a study of the specification, taken in connection with the annexed drawing, wherein:

Figure 1 is a view on an enlarged scale—substantially twice the size of the working model—of the complete, assembled trap, a portion being broken away to show part of the construction.

Figure 2 is a part-sectional view on the line 2—2 of Figure 1.

Figure 3 is a view of the right-hand end of Figure 2.

Figure 4 is a fragmentary view of the central portion of Figure 3, showing one of the trap closures in open position.

In the various views, 1 is a tubular member which may be made up of rolled paper, giving a laminated structure, or pressed pulp, or some other material which has considerable strength when formed into tubular shape somewhat on the order of a mailing tube. For example, a trap made according to the drawing will bear up a normal-weight person without any damage whatever to the trap. The tube is preferably treated with paraffine wax or the equivalent to prevent the tube taking up moisture from the bait, or from contaminating the bait.

Fitting over the tubular member 1 and meeting on the dotted line 2, are two cylindrical members 3 and 4 which are preferably made out of paper or cardboard formed in a manner similar to mailing tubes. Each of the members 3 and 4 has attached thereto a cap 5 which may be of suitable metal; for example, tin may be used if properly enameled to prevent rusting and contamination of the bait. The cap 5 has formed therein an annular flanged recess 6. One edge 7 of the cylindrical member 4 is positioned within the annular recess 6 and the metal 8 of the flange is spun over and into the member 4, thereby preventing the cap 5 from being pulled off the member 4. In addition, the metal of the cap 5 is indented at a plurality of places 9 so as to force the metal into the member 4 as indicated at 10, thereby preventing the cap 5 from turning relative to the member 4.

Each of the caps 5 is provided with a scoring 11 so that the portion 12 bounded by the scoring may be forced inwardly as indicated in Figure 4, thereby opening the trap for access by the insects, it being understood that before both parts 3 and 4 are assembled on the member 1, the bait is inserted within the member 1 in an amount such that it will always be below the line of the scoring 11.

After the caps 5 have been assembled on their respective members 3 and 4, they form cup-shaped members which are of a length so that when they meet on some line such as 2 there will be a slight clearance 13 between the end of the member 1 and the cap 5. After the parts have been assembled as above described, they may be held together by a label 14 wrapped around the trap between the edges of the flanges 8 of the caps 5. The label or the outer surface of the cups 3 and 4 or both may be treated with an adhesive so that when the label is properly applied around the parts as shown in Figures 1 and 2, the cups 3 and 4 are held securely in position over the tubular member 1.

It is to be understood that the label when used will carry all the instructions for use in handling the trap, the trade-mark under which the device is sold, and other indicia. As an alternative construction, the indicia or printing may be applied direct to the cups 3 and 4 and then, after the cups are assembled to the body member 1, the whole can be dipped into a bath of transparent waterproofing and binding material which will hold the cups 3 and 4 securely in place and at the same time protect the interior of the trap from moisture.

The trap being cylindrical in form may, after openings have been made in the opposite end caps, be thrown down and rolled into places not easily accessible but which are inhabited by the insects, thereby making a very convenient device in practical use.

While we prefer to use a cylindrical form as shown in the drawing for the reasons explained, as well as to give strength, the form may be altered. Furthermore, while the foundation member 1 is preferably made up something like a mailing tube, it may be moulded from any suitable material. Also, the caps 5 forming the bottom of the cups 3 and 4, while preferably made of metal, may be made of some other material; or the cups may be made all in one integral piece. In addition, instead of the cups being substantially identical, only one long cup may be used, in which case its wall will extend somewhat beyond one end of the member 1, and a cap 5 applied thereto as in Figure 2 after the bait has been put into the chamber. Another form which may be used, and which will be obvious by reference to Figure 2 without any additional view, comprises making the member 1 and the walls of the cups 3 and 4 integral, which may be readily done if the piece is moulded or if it is made from wrappings of fibrous material, the last wrapping or wrappings extending out beyond the ends of what is now the member 1, thereby providing extending annular flanges at both ends to allow for the application of the caps 5.

All such changes come within the limits of our invention and the scope of the appended claim.

What we claim is:

An insect trap comprising a central tube, tubular members surrounding said central tube and having adjacent ends thereof in abutting relation, metallic caps on the other ends of the tubular members, said caps having recessed portions in slight spaced relation to the central tube, said central tube having moistureproof material on the inner and outer walls and the end surfaces thereof, scorings in the caps, a label surrounding the tubular members and abutting the caps, said label and caps having the entire exterior surfaces thereof treated with waterproof material, and bait within the central tube, said portion of the caps defined by the scorings being adapted to be forced inwardly to provide openings to the interior of the central tube by insects, and said moistureproofing preventing ready transfer of moisture from the bait to the central tube or from the atmosphere to the bait.

GEORGE G. WITTWER.
WILLIAM M. STIEH.